(12) United States Patent
Tiganik et al.

(10) Patent No.: US 12,085,075 B2
(45) Date of Patent: Sep. 10, 2024

(54) PUMP CONNECTING AND ADJUSTING SYSTEM

(71) Applicant: EasyFlow Oü, Tartu (EE)

(72) Inventors: Taavi Tiganik, Byron Bay (AU); Maksim Maksimenko, Kyiv (UA)

(73) Assignee: EasyFlow Oü, Tartu (EE)

( * ) Notice: Subject to any disclaimer, the term of this patent is extended or adjusted under 35 U.S.C. 154(b) by 221 days.

(21) Appl. No.: 17/352,110

(22) Filed: Jun. 18, 2021

(65) Prior Publication Data

US 2021/0396225 A1    Dec. 23, 2021

(30) Foreign Application Priority Data

Jun. 19, 2020  (AU) ................................ 2020902049

(51) Int. Cl.
*F04B 53/16* (2006.01)
*F04B 53/22* (2006.01)

(52) U.S. Cl.
CPC .............. *F04B 53/16* (2013.01); *F04B 53/22* (2013.01)

(58) Field of Classification Search
CPC ................................ F04B 53/16; F04B 53/22
See application file for complete search history.

(56) References Cited

U.S. PATENT DOCUMENTS

| | | | |
|---|---|---|---|
| 1,982,254 A | 1/1934 | Juengling | |
| 3,369,783 A | 2/1968 | Keating | |
| 3,588,009 A | 6/1971 | Koehlke et al. | |
| 4,033,531 A | 7/1977 | Evine | |
| 4,733,738 A | 3/1988 | Rowe | |
| 5,240,216 A | 8/1993 | Lin et al. | |
| 7,191,998 B1* | 3/2007 | Chalberg | F16M 7/00 248/676 |
| 8,152,128 B2 | 4/2012 | Asplund et al. | |
| 2008/0048445 A1 | 2/2008 | Lum | |
| 2009/0267344 A1 | 10/2009 | Andrei | |
| 2015/0063987 A1 | 3/2015 | Herger | |
| 2017/0152865 A1 | 6/2017 | Lie | |
| 2019/0331133 A1 | 10/2019 | Cao et al. | |

FOREIGN PATENT DOCUMENTS

| | | |
|---|---|---|
| AU | 2012265619 B2 | 8/2013 |
| AU | 2015278981 A | 12/2015 |
| AU | 2017234645 B2 | 10/2018 |
| CN | 103206386 A | 7/2013 |

* cited by examiner

*Primary Examiner* — Grant Moubry
*Assistant Examiner* — Ruben Picon-Feliciano
(74) *Attorney, Agent, or Firm* — Bonini IP Law, LLC; Frank J. Bonini, Jr.

(57) ABSTRACT

A pump height adjuster having spaced uprights on opposite sides of the pump, where each upright has a range of adjustment to cater for a range of inlet and outlet adapter sets, the uprights being on opposite sides of the pump for either continuously adjustable pump heights or discrete selectable pump heights along the adjuster. Each selectable height corresponds to a predetermined height position corresponding to a pump and adapter set. The vertical adjustment of the pump uses feet and with reference to the foot, the foot has a horizontal base and an upright with a vertical adjustment slot. The upright may have spaced notches physically marked 1-6 on the pump side of the upright and each of the notches may receive a rib on the pump so that the pump height may be set in advance, and a user may secure a replacement pump at the desired height.

16 Claims, 4 Drawing Sheets

PUMP CONNECTING AND ADJUSTING SYSTEM

TECHNICAL FIELD

THIS INVENTION relates to installation of pool pumps and particularly to a height adjustment to aid alignment of the pump with plumbing and to a pump height adjuster.

BACKGROUND

At present the pump market is dominated by a relatively small number of pump suppliers. Due to the variations in inlet and outlet positions between the different available pumps, a pool owner has to replace a pump with exactly the same pump. If a different replacement pump is desirable, the replacement pump may not match, as is frequently the case, to the existing plumbing. This means a simple exchange is not usually possible. In most pumps, typically centrifugal pumps, the inlet and outlet are generally in the same plane providing a flow path from a horizontal inlet through a pre-filter, then an impeller to a vertical outlet, so there is often primarily some range of offset both horizontal and vertical between the existing plumbing and the inlet and outlet in the case of a non-matching replacement pump. This means additions have to be made to the plumbing and often this may be in tight spaces, or otherwise made difficult, and potentially considerable added costs may be involved.

The Applicant sought a PCT Article 15/5 Search report and written opinion with the search statements provided by the Applicant. That search report revealed the following prior art. There were seven "A" category documents namely; U.S. Pat. Nos. 3,369,783; 3,588,009; 4,033,531; US2008/0048445; US2009/0267344; U.S. Pat. No. 8,152,128; US2017/0152865 and two X category documents, namely U.S. Pat. No. 7,191,998 and US2015/0063987. The claims have been framed to account for the written opinion.

In addition to the above, the Applicant is aware of the following patent specifications which provide alternative solutions for adjusting pump inlet/outlet positions; AU2017234645; AU2012265619 and AU201527898. The reader is encouraged to read these documents noting in particular, that from a general point of view, these illustrate that pump inlet/outlet positions may be adjusted in one of three ways, moving the whole pump, moving the inlet/outlet on the pump or a combination of these, or by making a pump that is reconfigurable to give different inlet/outlet options. In the first two of these, the inlets and outlets are in basically the same position on the pump.

In US2015/0063987 (Herger) a pump housing is mounted to a base plate that comprises exchangeable spacers positioned between the base and the pump. The height of the pump is adapted by selecting the length of the spacers. The spacers may be cut to different lengths.

In U.S. Pat. No. 7,191,998 (Chalberg et al.) for installation of a pump near to an exterior wall of a tub or a spa bath provides as an essential requirement adjustability along three orthogonal axes adjacent the exterior wall. To this end there is provided a pump mounting stand comprising an angle bracket having a horizontal bottom plate and a vertical plate having numerous hook hanger slots in columns and rows. The pump is fitted with mounting brackets having hooks. The hook hanger slots are located virtually top to bottom on the vertical plate to receive the hooks. According to Chalberg et al. the whole stand may be moved in and out or along the tub. The horizontal plate includes screw holes. Then a pump may be cantilevered from the vertical plate by being fitted into the array of slots at a selected position. Also different sized pumps may be accommodated. Stability is achieved by having the bottom plate extend well under the pump to counter the weight of the pump. Essentially, Chalberg et al. achieves his objective of adjustability along three orthogonal axes by relying on a co-planar array of slots for two directions and then shifting the whole array in the third direction.

Herger and Chalberg et al. use pump supports suited to their particular environments and generally the arrangement of Chalberg et al. in particular at least, is not suitable for Applicant's applications. As far as Herger is concerned Applicant's proposal is mechanically completely different.

The present invention enables the position of the whole pump to be moved and adjusted. In a preferred form it aids pump replacement. It can aid in a non-matching and typically a generic pump arrangement having a fixed inlet and fixed outlet, to be reconfigured, to match the existing plumbing where a different pump had previously been operating. While the present height adjustment may be used for pump replacement, it will be appreciated that it may also be used in new pump installation where adjustment is desirable.

SUMMARY OF THE INVENTION

In a first aspect there is provided a pump height adjuster having spaced uprights adapted to be set on opposite sides of the pump and each upright having pump position guides used to secure the pump at selected positions relative to the upright. The adjuster in this case may have either continuously adjustable pump heights or discrete selectable pump heights along the adjuster, each selectable height corresponding to a predetermined height position corresponding to the pump and adapter set in accordance with the second aspect below. The selectable pump heights are usually unevenly spaced along the adjuster.

In a second aspect there is provided a pump height adjuster for a pump and inlet adapter set, the adjuster having either continuously adjustable pump heights or discrete selectable pump heights along the adjuster, each selectable height corresponding to a predetermined height position corresponding to the pump and adapter set. The adjuster in this case may have spaced uprights adapted to be set on opposite sides of the pump and each upright having pump position guides used to secure the pump at selected positions relative to the upright in accordance with the first aspect.

Where one or more uprights are employed each upright may have selectable set positions in terms of height so that a user may select a height for a particular pump. There may be pump position guides used to secure the pump at selected positions relative to the upright. The pump preferably has a flange arising from the joining of flanges of a motor part and a wet end impeller/pre-filter part, it is preferable that the uprights attach to the pump at or about this flange. Typically, there is a through hole in the flange that is aligned with a slot to take a bolt or other fastener.

In one application the pump height adjuster may be used with a replacement pump. In one example it may include vertically spaced projections or notches each corresponding to a height position of a specified replaced pump setting so that the replacement pump may be locked in place at that setting.

The uprights may project from spaced feet set on opposite sides of the pump, each upright includes vertically spaced projections or notches, the pump having corresponding projections or notches adapted to fit into the projections or notches in the uprights. This provides discrete settings. In another example and an alternative where the pump height adjuster has spaced feet, each foot typically has a base and a vertical pump adjustment slot. This provides continuous variation in setting.

In one preferred form where a pump height adjuster is using a foot, the foot may have a horizontal base and an upright, the upright having a vertical adjustment slot, the replacement pump having a flange, the flange having a through hole that is aligned with slot to take a bolt which may be secured by a nut, the nut and bolt may secure the pump relative to the foot at a selected position in the slot, so the pump may be raised or lowered, the upright having spaced notches and the pump having a rib adapted to fit into the notches, the upright and each of the notches may receive the rib on the pump so that the pump height may be set in advance, each notch position being in accordance with a pump concordance for the pump being replaced and then a user simply tightens the nut and bolt to secure the pump at the desired height.

Where the configuration and setup of the pump is known in advance, the pump height adjuster may have vertically spaced pump connections with indicia corresponding to particular selectable pump setups so that the pump height may be set in advance by selecting the indicia and connecting the pump to that connection.

In order for the inlet and outlet adapters to match the existing plumbing it is preferable that the pump be adjustable vertically. Typically, this is by using an adjustable foot or feet or base upon which the pump is mounted. Preferably, the adjustment is between the foot and pump, usually at the connection between the two. Typically, the means for vertical adjustment may be a slot or post arrangement with the pump supported on opposite sides of the pump. The slot may be in a vertical section of the foot. In another form the pump has selectable set positions in terms of height so that a user may select the right height for the adapters being used. There may be a projection or aperture used to set the pump's vertical position by engagement of the projection or aperture with the vertical setting matched to a set position corresponding to the replaced pump. In one preferred embodiment, a foot may include vertically spaced projections or notches each corresponding to a height position of a specified replaced pump so that the replacement pump may be locked in place at that setting. In this case the pump position may be preselected so there is no need for any back and forth fine adjustment. In this case the slot may be used to secure rather than adjust.

Having regard to the above one application of the adjuster is to pump replacement, to this end there is provided a pump assembly when used in existing plumbing as a replacement pump assembly, the pump assembly having a pump including an inlet and an outlet, and respective inlet and outlet adapters being attachable to the inlet and outlet of the pump in order to reconfigure the pump inlet and outlet to match the existing plumbing. The adjuster is then used to position the adapted inlet and outlet so they can appear to be the same as the replaced pump.

Thus in a preferred application to a pool pump, there is provided a method of fitting a replacement pool pump in existing plumbing where the method includes the step of using at least one adapter, using a height adjuster as described to match the pump to the existing plumbing. In a further step the method includes the step of selecting the at least one adapter from a range of adapters. In still further step the method includes the step of selecting an inlet adapter and an outlet adapter. The adapters generally will vary depending on the pump being replaced and the possible range of movement to get the lineup needed and the range, some adapters may be longer than others, some may be straight, others may be inclined and many other options are available. Generally, the adapters will have standard connector ends so that they fit directly to the existing plumbing.

Preferably, each adapter has an adapter mounting flange and the pump has a corresponding adapter mounting collar, so the adapters may be fixed to the pump, subject to the selection of an adapter, suitable to adapt the pump to the existing plumbing, for any set replacement pump inlet and outlet design. This means there is adaptation of the pump at any selected vertical position of the pump. In a preferred form and as an example for the pump inlet and outlet relationship the "universal" or "generic" pump may be adapted to existing pumps. As an alternative adapter connection to the pump, the pump may have one or both of an internally threaded inlet and outlet and the pump side of the adapters may have a matching external thread to the internal thread of the pump. Thus at least one adapter connection to the pump is by a threaded connection. In this example where at least one adapter connection to the pump is by a threaded connection, the connection employs an employing an O-ring seal and the threaded connection, when the adapter is connected, limits pressure on the O-ring. Typical in this embodiment the adapter may include a recess for an O-ring and the length of the threads are selected so that when the adapter is tightened the thread on the adapter is fully home to a stop position at the end of its travel and at the same time ensures that the O-ring is properly compressed for optimal seal.

BRIEF DESCRIPTION OF THE DRAWINGS

In order that the present invention may be more readily understood and put into practical effect reference will now be made to the accompanying drawings which illustrate preferred embodiments of the invention and wherein:—

DETAILED DESCRIPTION OF THE INVENTION

Figure 1:
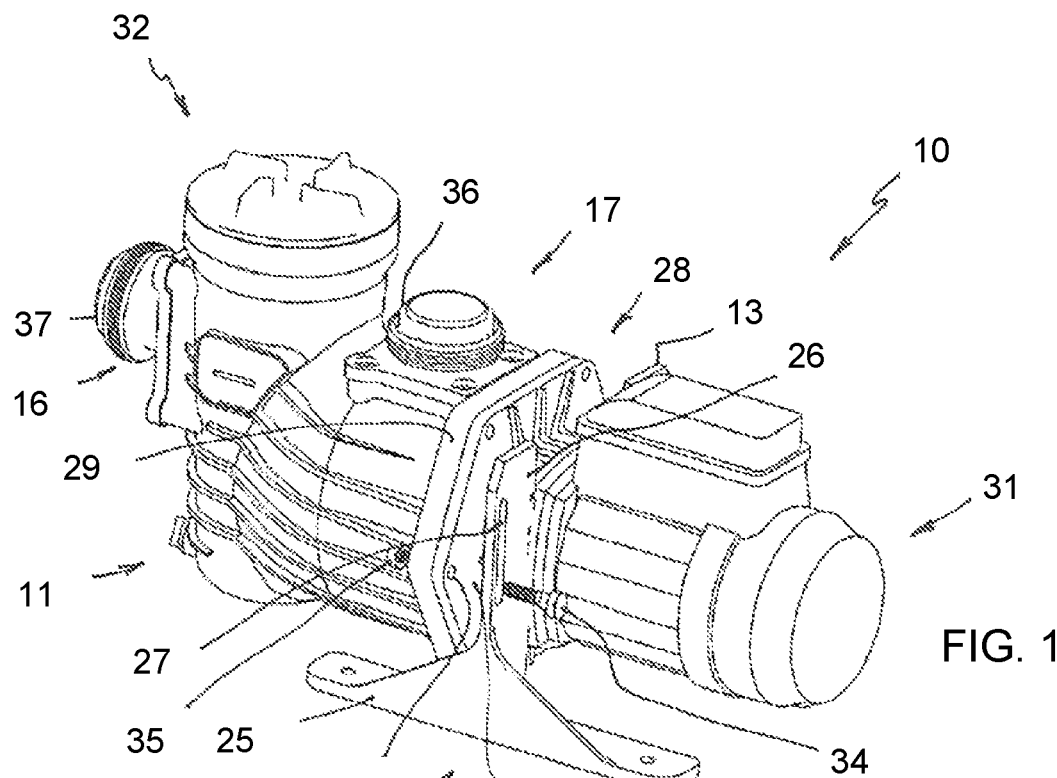
FIG. 1 is a perspective drawing from the back and to one side illustrating a pump assembly according to the present invention employing a pump utilising a first embodiment of an adjustable foot.
Figure 2A:
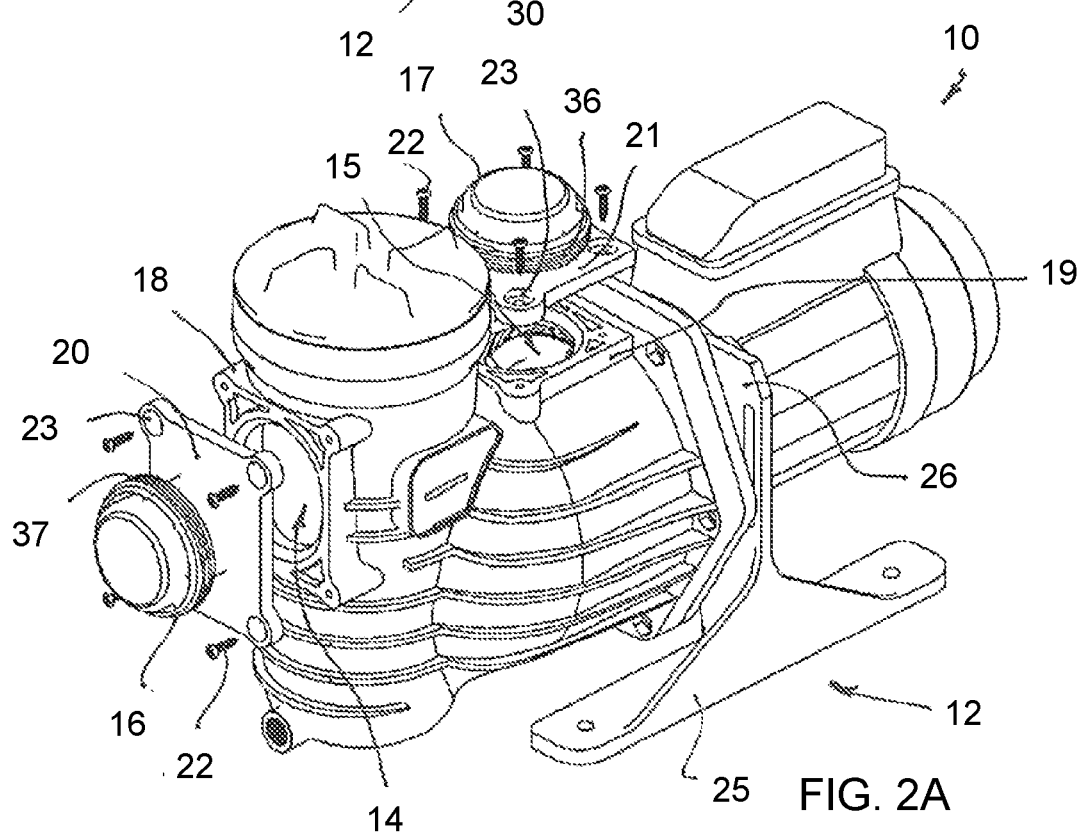
FIG. 2A is a perspective view from the front showing the same pump assembly.

Referring to the drawings, there is illustrated in FIGS. 1 and 2A a pump assembly 10 having a pump 11 supported by bi-laterally positioned feet 12 and 13 with a height adjuster function to be described below. The pump 11 has an inlet 14 and an outlet 15.

The actual pump 11 depicted is exemplary and does not form part of the broadest form of the present invention. Also the positions of the inlet and outlet are variable in the sense that, even though they may be fixed for any pump, the pump may be designed with these in different places, this variation will of course alter the adapter and the relative dimensions shown in the drawings.

The assembly includes respective inlet and outlet adapters 16 and 17. The inlet and outlet adapters are interchangeable with other adapters so that the pump 11 may be reconfigured as a replacement pump to match the existing plumbing of the pump being replaced. The pump may be used with the height adjuster in new installations.

As regards the range of pumps that may be replaced, the inlet and outlet of the pump fall inside the inlet and outlet positions of a whole range of pumps being replaced so that the assembly may accommodate the particular adapters.

In these embodiments each inlet and outlet has a mounting collar 18 and 19 respectively, and each adapter has a mounting flange 20 and 21 respectively. The mounting flanges are secured to the mounting collars by screws 22 passing through holes 23 as shown. FIG. 2A shows a set position of the mounting flange and the mounting collar by reason of the screw receiving holes 24 and the mounting collars 18 and 19. However, it will be appreciated that slots or the like may be employed to enable limited sliding movement of the mounting flange on the mounting collar for minor adjustments. Although not shown a sealing gasket may also be employed between the mounting flange and the mounting collar.

Figure 2B:
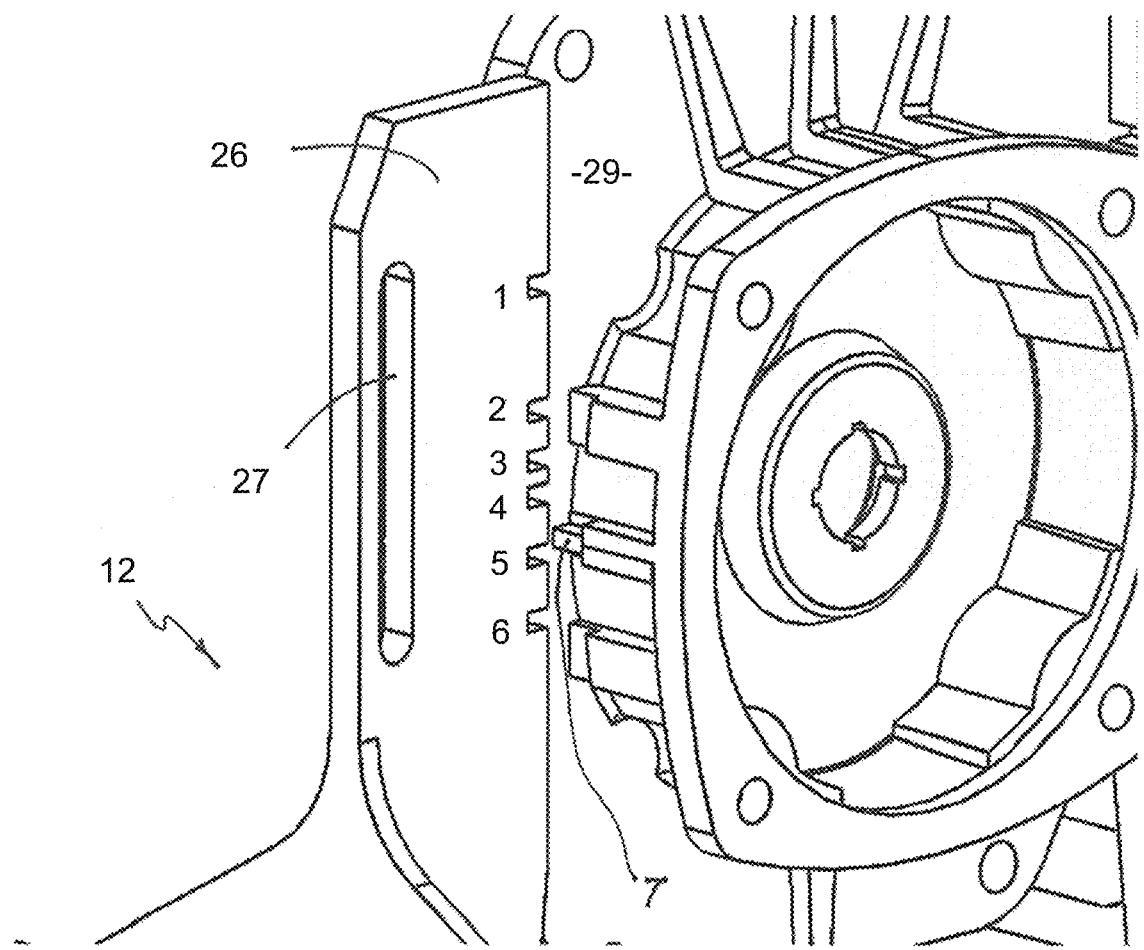
FIG. 2B is a detail of FIGS. 1 and 2A.

Referring to FIGS. 1 and 2A and 2B the vertical adjustment of the pump 11 using the feet 12 and 13 will now be described with reference to the foot 12, it being understood that a corresponding foot 13 operates on the opposite side of the pump 11. The feet 12 and 13 may be integrally formed as a single unit or as separate feet. The foot 12 is shown in exploded position in FIG. 1.

The foot 12 has a horizontal base 25 and an upright 26. The upright 26 has a vertical adjustment slot 27. The pump 11 has a flange 28 arising from the joining of flanges 29 and 30 of the motor part 31 and the wet end impeller/pre-filter part 32. There is a through hole 33 that is aligned with slot 27 to take a bolt 34 which may be secured by a nut 35. Thus the nut and bolt may secure the pump relative to the foot at a selected position in the slot 27 so the pump 11 may be raised or lowered, thus, adjusting the vertical position of the inlet 14 and the outlet 15. This in turn adjusts the position of adapters that are being used. This is a first type of adjuster and is continuously variable. To simplify the height position the upright 26 may have spaced notches physically marked 1-6 on the pump side of the upright and each of the notches may receive a rib 7 on the pump so that the pump height may be set in advance. The user reads the notch 1-6 off a pump concordance for the pump being replaced and out the rib 7 in that notch and then simply tightens the nut and bolt 35,34. Thus the pump height is automatically set. This is a second type of adjuster that is used for geometries known in advance. Bother adjusters may be provided.

The adapters 16 and 17 have connector parts 36 and 37, in this case it is shown as externally threaded spigot connector parts. These are also moved vertically for any selected adapter as the pump is moved. It will be appreciated that the connector part may vary depending on the type of connector used in the existing plumbing. The particular type of connector is not part of the broadest form of the present invention.

To summarise what is described so far, the pump has a fixed inlet and a fixed outlet. The relative positions depend on the pump design. Adapters and vertical adjustment required depend on these inlet and outlet starting positions. As regards the existing plumbing for the replaced pump, the replacement pump inlet and outlet may be adjusted vertically. As regards their fixed relative positions, the inlet and outlet on the pump are fixed for a particular pump design. Then a selected adapter sets the position of the adapter connector at the same position as it would have been for the replaced pump. Thus it is matched to the existing plumbing. So far as the existing plumbing is concerned, the replacement pump has, by reason of the adapters, connectors in the same place as the replaced pump. This of course is allowing for give and play which is usual in the PVC plumbing, so this will accommodate any small differences in position, it being understood the important factor is that the existing connectors connect for the proper pumping effect. What we mean is, that specific dimensions are not important, all that is required is the connection be effectively made through the adapter selected. Furthermore, on the point of the specific dimensions, it will also be appreciated that the particular specific form of the adapters and the dimensions is not an essential feature of the broadest form of the invention. This is because the adapters may be connected to the pump in any way and it may take minor adjustments to the end of the existing plumbing, within the ambit of DIY, to make a match and this may, for example, involve replacing the connector on the existing plumbing to match the adapter.

Figure 3:
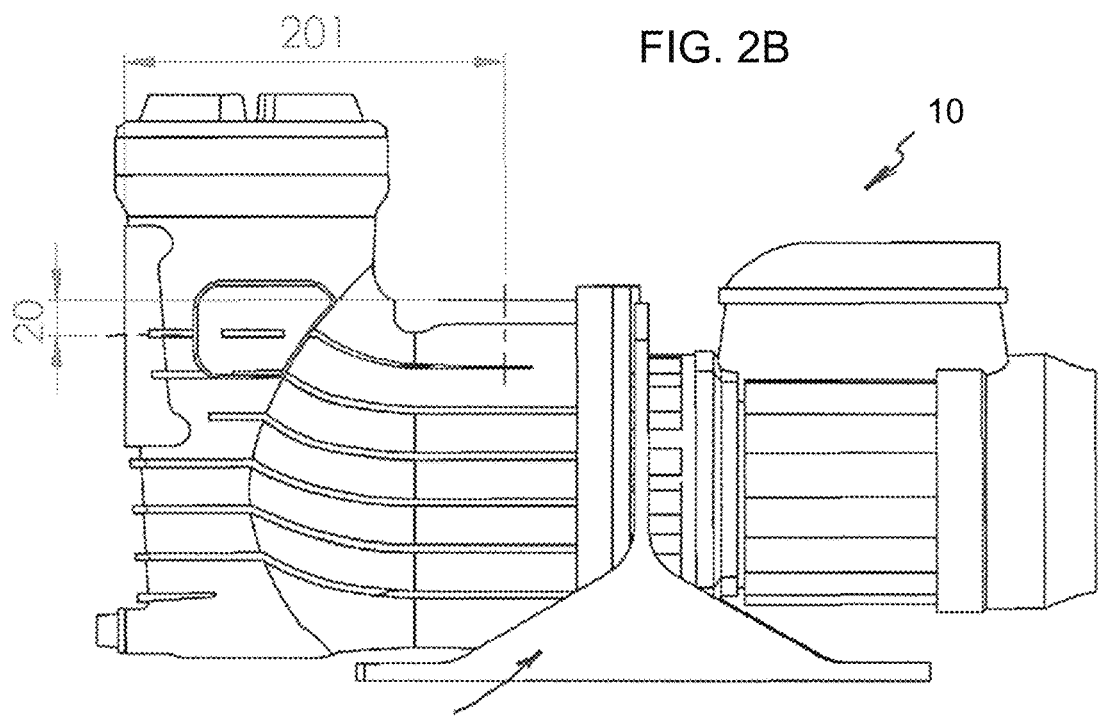
FIG. 3 is a drawing illustrating the relative positions of the inlet and outlet for the "generic" pump of FIGS. 1 and 2A.

The relative dimensions of the replaced pump and its adapters for the replacement pumps are shown on the drawings in millimetres and are set out in the following table for the inlet and outlet relationship shown in FIG. 3.

| Brand | Model | Out height | Inlet center | Outlet centre | Set height notch No. FIG. 2B |
|---|---|---|---|---|---|
| Astral | CTX | 295 | 217 | 272 | 3 |
| Davey | PM | 284 | 246 | 254 | 2 |
| Davey | SLL | 256 | 233 | 300 | 5 |
| Davey | Typhoon | 308 | 226 | 239 | 2 |
| Hayward | Superpump II | 272 | 212 | 263 | 4 |
| Hayward | Superpump | 308 | 201 | 272 | 5 |
| Onga | LTP/PPP | 247 | 183 | 274 | 6 |
| Onga | Silentflo | 350 | 252 | 290 | 1 |
| Onga | Superflo | 270 | 202 | 237 | 5 |
| Poolrite | SQI | 317.5 | 191 | 302 | 5 |
| Waterco | Supatuf | 265 | 201 | 265 | 5 |
| Waterco | Hydrostorm | 295 | 201 | 259 | 5 |
| Waterco | Supastream | 265 | 217 | 237 | 4 |
| Zodiac | Flopro | 269 | 197 | 239 | 5 |
| Zodiac | Titan | 309 | 225 | 225 | 2 |

Figure 4:
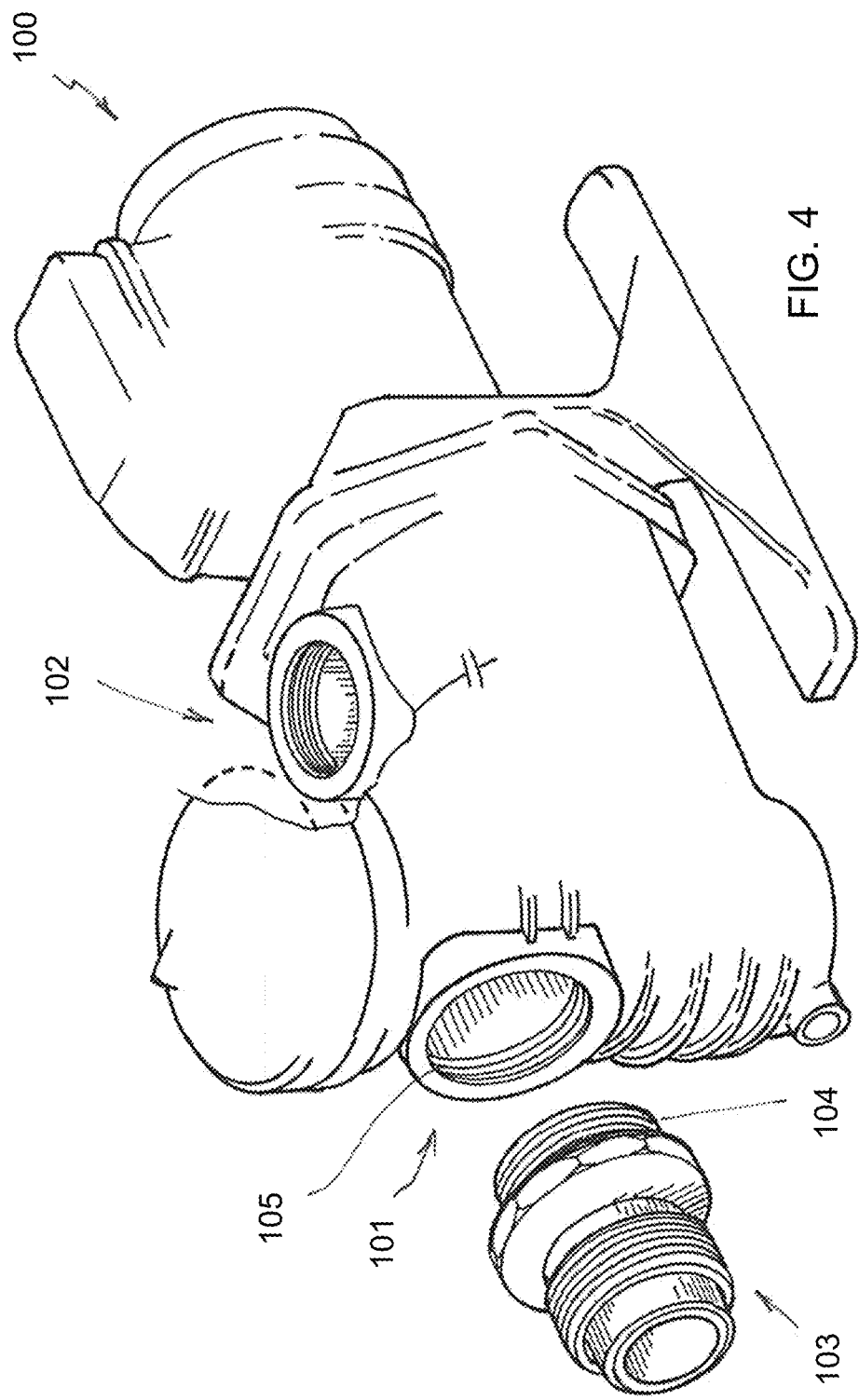
FIGS. 4 and 5 are drawings illustrating an alternative adapter connection to the pump.

These dimensions will change if the dimensions in FIG. 4 change. The drawings should not be taken as being to scale but illustrative of the principle of the invention. The dimensions in any case will of course depend upon the position of the inlet and outlet on the replacement pump so the present invention cannot be avoided by designing a pump with inlets and outlets that change the dimensions and adapter configurations from that given in the table as these are only exemplary for the particular design of the replacement pump shown in FIG. 3.

The adapters in the present examples differ in terms of length, for example, an inlet adapter may be shorter for one set up than the inlet adapter for another set up. They may be offset and shorter or longer depending on where they need to end up. They may have different diameters. The threads depend upon the internal thread on the existing plumbing.

It should be abundantly clear from the illustrated examples, the type and form of the adapters and their variations as employed are to suit the pumps to be replaced and therefore a pool owner may simply buy a generic pump which has with it the option to select from a range of adapters, the adapters required for the old pump model and it is simple DIY replacement.

The invention as described uses any generic pump, with any starting position of its unadapted inlet and outlet with the use of adapters of any kind with an ending position which retains the existing plumbing, and results in DIY connection for "effective operation" of the pump.

Figure 5:
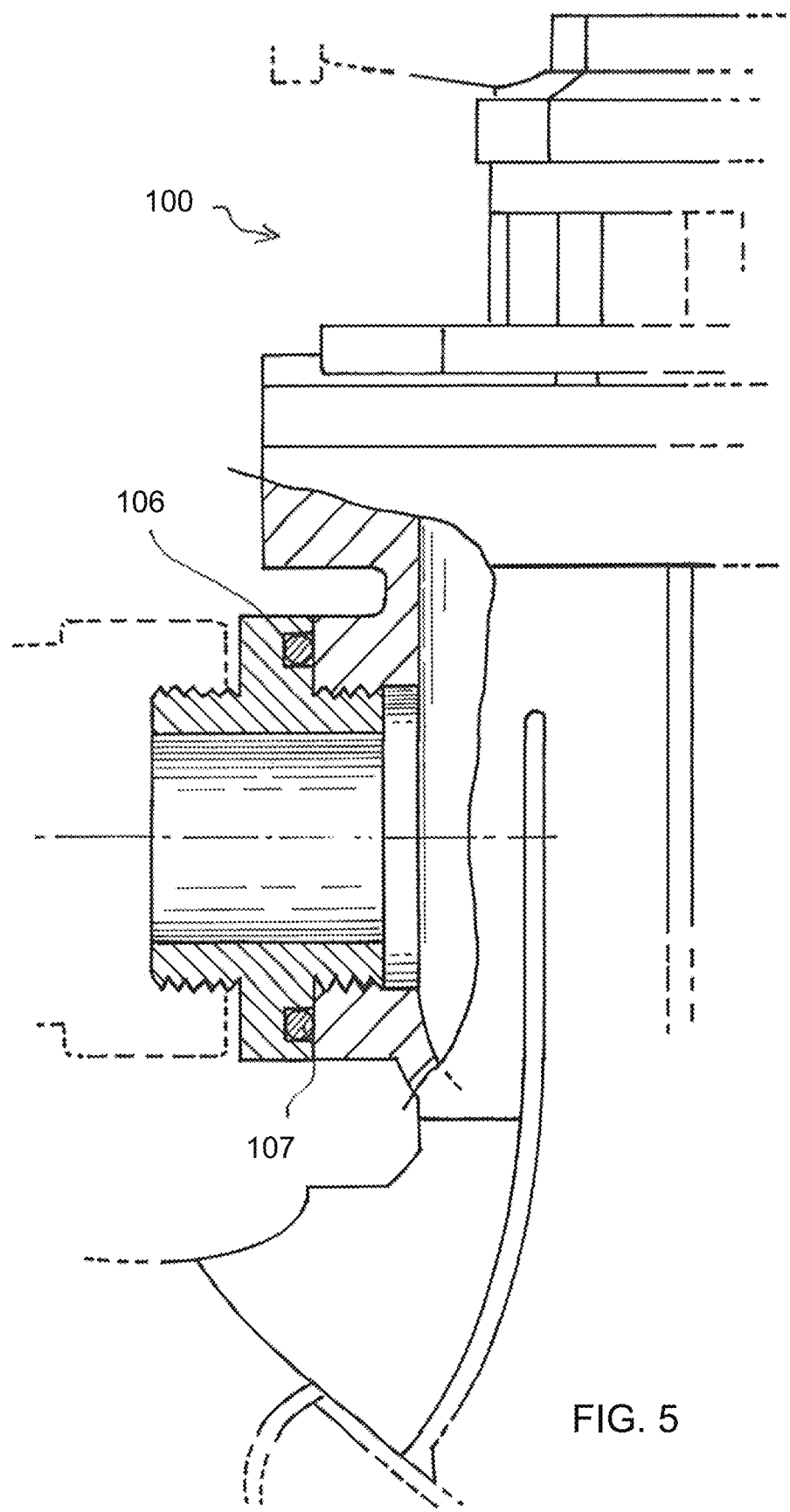

FIGS. 4 and 5 illustrate an alternative adapter connection to the pump. In this case the pump 100, is in all material respects the same as the previous embodiments but in this case has an internally threaded inlet 101 and outlet 102 and the pump side of the adapters is as illustrated for the inlet adapter 103. This has a matching external thread 104 to the thread 105. Now the adapter included a recess 106 for an O-ring 107 and the length of the threaded sections 104 and 105 are selected so that when the adapter is tightened the thread is fully home to a stop position at the end of its travel and at the same time ensures that the O-ring is properly compressed for optimal seal. This means that the adapter can not be overtightened.

Whilst the above has been given by way of illustrative example many variations and modifications will be apparent to those skilled in the art without departing from the broad ambit and scope of the invention as set forth in the appended claims.

What is claimed is:

1. A replacement pool pump and a pump height adjuster comprising:
    the pump having an outlet end, an end opposite the outlet end and opposite sides extending between the ends;
    wherein the pump height adjuster has spaced uprights set on said opposite sides of the pump so the pump is supported on both sides,
    wherein each upright has a range of adjustment to provide for a range of inlet and outlet adapter sets,
    wherein the uprights being on opposite sides of the pump for either continuously adjustable pump heights or discrete selectable pump heights along the adjuster, and
    wherein each selectable height corresponding to a predetermined height position corresponding to a pump type and an adapter set type for the pump.

2. The replacement pool pump and pump height adjuster according to claim 1, wherein each upright having pump position guides used to secure the pump at selected positions relative to the upright.

3. The replacement pool pump and pump height adjuster according to claim 1, the adjuster having discrete selectable pump heights unevenly spaced along the adjuster, each selectable height corresponding to the predetermined height position corresponding to the adapter set type for the pump.

4. The replacement pool pump and pump height adjuster according to claim 1 when used with a replacement pump and including vertically spaced projections or notches each corresponding to a height position of a specified replaced pump setting so that the replacement pump can be locked in place at that setting.

5. The replacement pool pump and pump height adjuster according to claim 1 wherein the uprights have selectable set positions in terms of height so that a user can select a height for the pump.

6. The replacement pool pump and pump height adjuster according to claim 1 wherein the uprights project from spaced feet set on opposite sides of the pump and each upright includes vertically spaced projections or notches, the pump having corresponding projections or notches adapted to fit into the projections or notches in the uprights.

7. The replacement pool pump and pump height adjuster according to claim 1 using a foot, the foot having a horizontal base and an upright, the upright having a vertical adjustment slot, the replacement pump having a flange, the flange having a through hole that is aligned with slot to take a bolt which can be secured by a nut, the nut and bolt can secure the pump relative to the foot at a selected position in the slot, so the pump can be raised or lowered, the upright having spaced notches and the pump having a rib adapted to fit into the notches, the upright and each of the notches can receive the rib on the pump so that the pump height can be set in advance, each notch position being in accordance with a pump concordance for the pump being replaced and then a user tightens the nut and bolt to secure the pump at the desired height.

8. The replacement pool pump and pump height adjuster according to claim 1 having spaced feet, each foot having a base and a vertical pump adjustment slot.

9. The replacement pool pump and pump height adjuster according to claim 1 having vertically spaced pump connections with indicia corresponding to particular selectable pump setups so that the pump height can be set in advance by selecting the indicia and connecting the pump to that connection.

10. The replacement pool pump and pump height adjuster according to claim 1 attached to the pump, the pump having a flange arising from the joining of flanges of a motor part and a wet end impeller/pre-filter part, the uprights attach to the pump at or about this flange.

11. The replacement pool pump and pump height adjuster according to claim 1, the adjuster having spaced uprights adapted to be set on opposite sides of the pump and each upright having pump position guides used to secure the pump at selected positions relative to the upright, the adjuster having discrete selectable pump heights unevenly spaced along the adjuster, each selectable height corresponding to a predetermined height position corresponding to a pump tyne and an adapter set type.

12. The replacement pool pump and pump height adjuster according to claim 1, the adjuster having spaced uprights adapted to be set on opposite sides of the pump and each upright having pump position guides used to secure the pump at selected positions relative to the upright, the adjuster having discrete selectable pump heights unevenly spaced along the adjuster, each selectable height corresponding to a predetermined height position corresponding to a pump type and an adapter set type, the discrete selectable pump heights comprising spaced projections or notches each corresponding to a height position of a specified replaced pump setting.

13. The replacement pool pump and pump height adjuster according to claim 1 wherein the uprights project from spaced feet set on opposite sides of the pump, the uprights being connected to the pump in a region at or near a connection between a motor part and a wet end impeller/pre-filter part.

14. The replacement pool pump and pump height adjuster according to claim 1 using a foot, the foot having a horizontal base and an upright, the upright having a vertical adjustment slot, a replacement pump having a flange, the flange having a through hole that is aligned with slot to take a bolt which can be secured by a nut, the nut and bolt can secure the pump relative to the foot at a selected position in the slot, so the pump can be raised or lowered, the upright having spaced notches and the pump having a rib adapted to fit into the notches, the upright and each of the notches can receive the rib on the pump so that the pump height can be set in advance, each notch position being in accordance with a pump concordance for the pump being replaced and then a user tightens the nut and bolt to secure the pump at the desired height, the uprights being connected to the pump in a region at or near a connection between a motor part and a wet end impeller/pre-filter part.

15. The replacement pool pump and pump height adjuster according to claim 1 using a foot, the foot having a horizontal base and an upright, the upright having a vertical adjustment slot, a replacement pump having a flange, the flange having a through hole that is aligned with slot to take a bolt which can be secured by a nut, the nut and bolt can secure the pump relative to the foot at a selected position in the slot, so the pump can be raised or lowered, and then a user tightens the nut and bolt to secure the pump at the desired height, the uprights being connected to the pump in a region at or near a connection between a motor part and a wet end impeller/pre-filter part.

16. The replacement pool pump and pump height adjuster according to claim 1 using a foot, the foot having a horizontal base and an upright, the upright having spaced notches and the pump having a rib adapted to fit into the notches, the upright and each of the notches can receive the rib on the pump in a selected one of notches so that the pump height can be set in advance, each notch position being in accordance with a pump concordance for the pump being replaced and then a user tightens the nut and bolt to secure the pump at the desired height, the uprights being connected to the pump in a region at or near a connection between a motor part and a wet end impeller/pre-filter part.

* * * * *